(No Model.) 3 Sheets—Sheet 1.

V. HEPP.
MACHINE FOR MAKING CEMENT PIPE.

No. 387,641. Patented Aug. 14, 1888.

Witnesses:
V. E. Hodges.
A. M. Bright.

Inventor
Valentine Hepp.
By his attorneys Leggett & Leggett.

(No Model.) 3 Sheets—Sheet 2.

V. HEPP.
MACHINE FOR MAKING CEMENT PIPE.

No. 387,641. Patented Aug. 14, 1888.

Witnesses:
W. A. Middleton.
E. W. Jones.

Inventor:
Valentine Hepp,
Per his
Luggett & Luggett, Attys

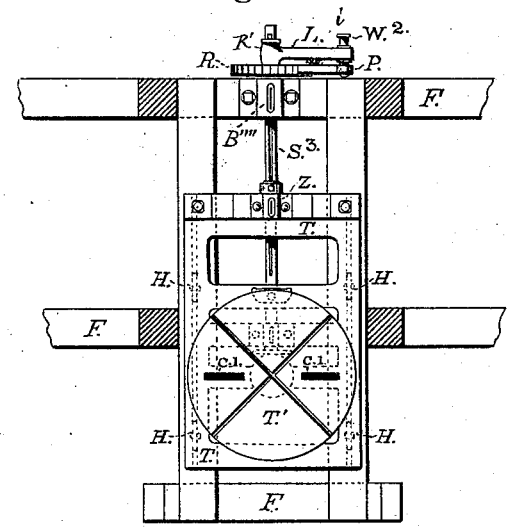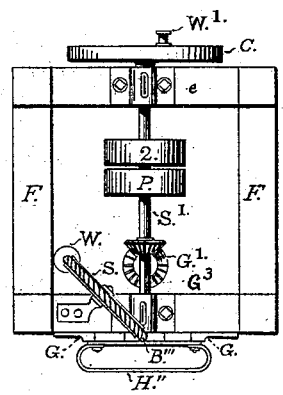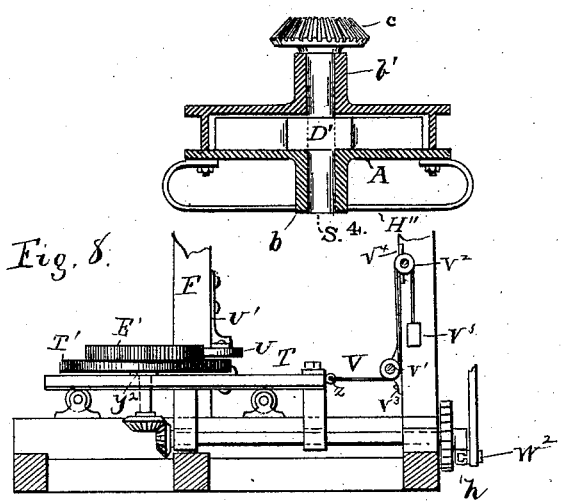

United States Patent Office.

VALENTINE HEPP, OF PORTLAND, OREGON.

MACHINE FOR MAKING CEMENT PIPES.

SPECIFICATION forming part of Letters Patent No. 387,641, dated August 14, 1888.

Application filed December 19, 1887. Serial No. 258,384. (No model.)

*To all whom it may concern:*

Be it known that I, VALENTINE HEPP, of Portland, in the county of Multnomah and State of Oregon, have invented certain new and useful Improvements in Machines for Making Pipe of Cement and Other Materials; and I do hereby declare the following to be a full, clear, and exact description of the invention, such as will enable others skilled in the art to which it appertains to make and use the same.

My invention relates to an improved machine for making pipe of cement or other material.

The object of my present invention is to produce a machine for the manufacture of pipe which will operate to pack material in a mold evenly and firmly.

A further object is to so construct the apparatus that the plunger which packs the material in the mold will have a reciprocating movement independent of the cross-head which carries it.

A further object is to provide means whereby the plate or table which carries the mold may be revolved after each stroke of the plunger.

A further object is to provide the apparatus with mechanism whereby the mold-carrying table may be moved so that pipes of different shapes may be made.

With these objects in view the invention consists in certain novel features of construction and peculiar combinations and arrangements of parts, as will be hereinafter set forth, and pointed out in the claims.

Figure 1:
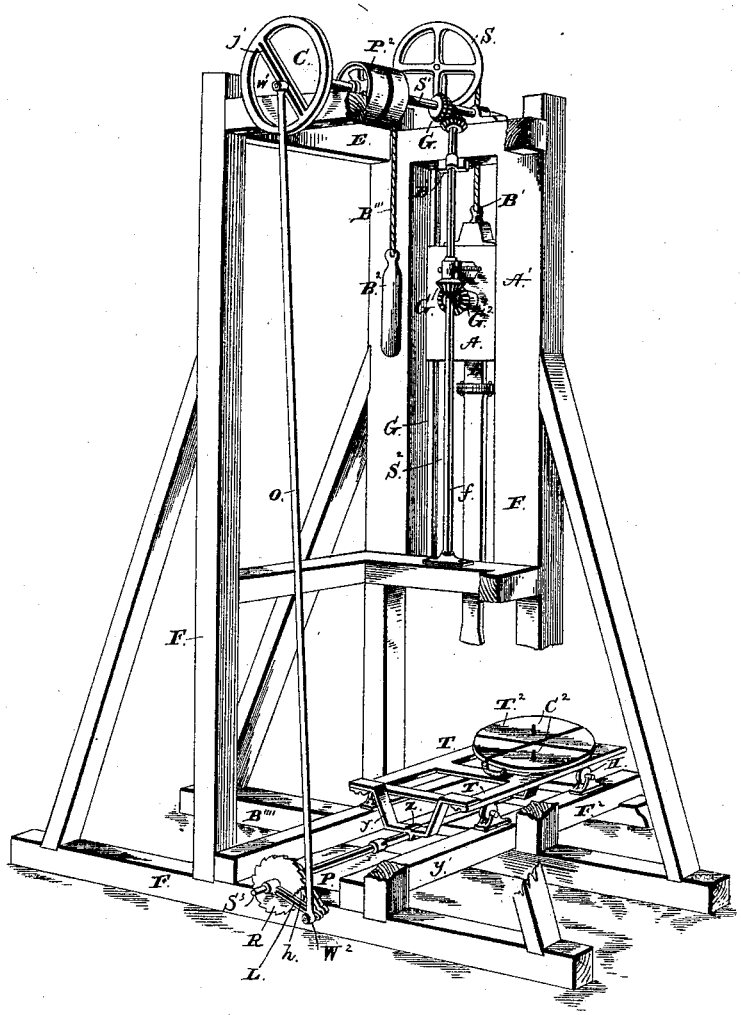
Figure 2:
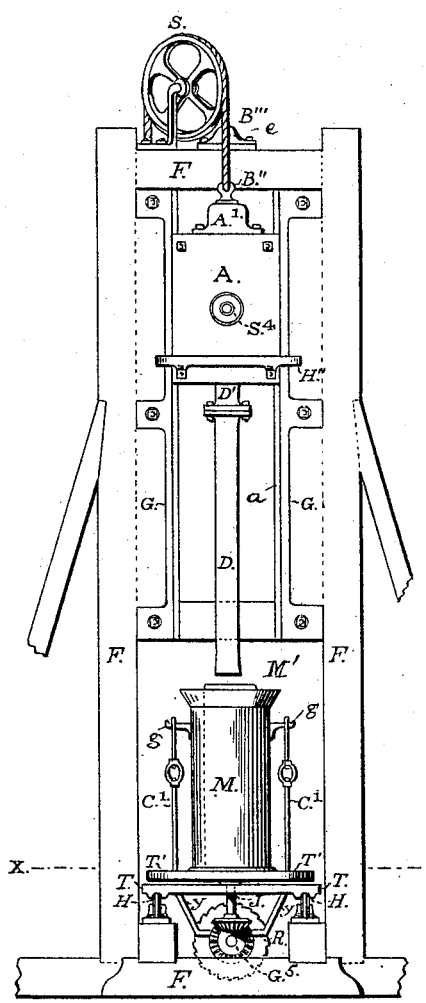
Figure 3:
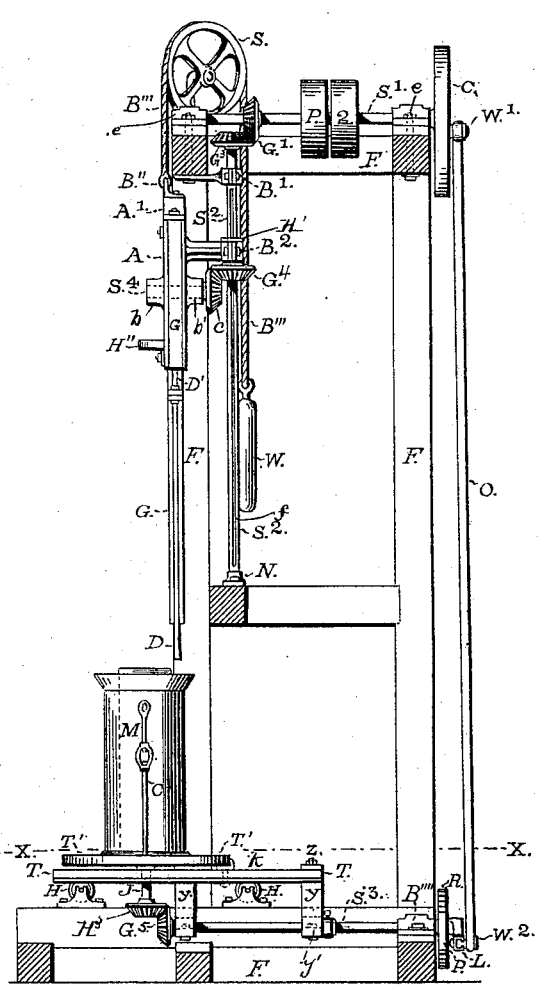

In the accompanying drawings, Figure 1 is a perspective view of my improved apparatus. Fig. 2 is a front elevation. Fig. 3 is a side elevation. Fig. 4 is a view taken on the line $x\,x$ of Fig. 3. Fig. 5 is a top plan view. Figs. 6 and 7 are sectional views of the cross-head A. Fig. 8 is a view showing the machine adapted for use in making pipes of different shapes.

F indicates suitable frame-work, of wood or other suitable material, and preferably braced by means of rods. A pair of guide-plates, G, having ears, are secured to the frame-work F by means of screws or bolts, which pass through said ears and into the frame-work, these guide-plates being projected inwardly between two uprights of the frame and provided with beads $a'$, as shown in Fig. 2. A cross-head, A, having grooves to receive the beads $a$, is placed between the plates G and adapted to have a vertical sliding movement therein. This cross-head is furnished on its top with a hollow cap, A', having an eye or loop at its upper end, to which latter a rope or chain, B'', is attached. The rope or chain B'' passes over a pulley or wheel, S, journaled in a bracket, B''', secured to the top of frame F, a counter-weight, W, being fixed to the free end of the rope to keep the cross-head suspended at the desired elevation.

The cross-head A is provided on its flat faces, preferably at or near the center, with two hollow bosses, $b\,b'$, which serve as journals for a shaft, $S^4$, carrying a bevel-pinion, $c$, at its inner end. An eccentric collar, E, is fixed to the shaft $S^4$ within the chamber $A^2$ of the cross-head, as shown in Fig. 7, and upon this collar is loosely mounted a square block, $D^2$.

Within the cross-head A is a yoke, D', adapted to receive the block $D^2$ and permit the same to have a horizontal sliding movement therein, as presently explained.

The chamber $A^2$ of the cross-head is of sufficient size to permit a vertical sliding movement of the yoke D', such sliding movement being guided by two arms, $D^3$ and $D^4$. The arm $D^3$ extends through a perforation made in the bottom of the cross-head A, and is formed at its lower extremity with a perforated flange, $d$. The upper arm, $D^4$, of this yoke D' is projected through a perforation in the top of the cross-head and adapted to enter the hollow cap-piece A', as shown in Fig. 7. Thus it will be seen that when the shaft $S^4$ is rotated, through the medium of mechanism which will be hereinafter described, the block $D^2$ will be forced to one end of the yoke D' by the eccentric collar E, and as the shaft $S^4$ and collar E continue to rotate the yoke will be raised within the chamber $A^2$. When the yoke is near its position of highest elevation, the block $D^2$ will begin to slide to the other end of the yoke D', and as the shaft completes its revolution said block will reach the opposite end of the yoke and the latter will be caused to descend.

A plunger, D, of any suitable size, having a flange, $d'$, at its upper end, is bolted or otherwise secured to the flange $d$ of the arm $D^3$, and has a reciprocating motion imparted to it in the manner above explained through the medium of the driving mechanism, which will now be described.

A shaft, $B'$, is mounted in brackets $e$ secured to the top of frame F, and provided at or near its center with fast and loose pulleys P and Q, over which a strap is passed to convey motion to said shaft from any suitable motor. (Not shown.)

The shaft $S'$ is furnished near one end with a bevel-pinion, $G'$, adapted to mesh with a bevel-pinion, $G^3$, keyed upon the end of a shaft, $S^2$. This shaft $S^2$ is journaled at its lower end in a bracket, N, fixed to a cross-bar of the frame and guided near its upper end in a bracket, $B'$, secured to the frame F. The shaft $S^2$ is made with a groove, $f$, which extends throughout its length between the brackets $B'$ and N, and a collar, $H'$, carrying a pinion, $G^4$, is slidingly mounted upon this shaft and provided with a spline or feather to enter the groove $f$ and thus prevent said pinion from turning independently of the shaft.

The collar $H'$ and pinion $G^4$ are supported and carried by a bracket, $B^2$, secured to the cross-head A, as shown in Figs. 1 and 2. From this construction it will be seen that when the shaft $S'$ is rotated the pinion $G'$, meshing with pinion $G^3$, will cause the shaft $S^2$ to turn and thus impart rotary motion to the pinion $G^4$, which latter pinion in turn will mesh with pinion $c$ and cause the reciprocating movement of the plunger, as above described.

Fixed upon the frame F at its bottom are two parallel timbers, $F^2$, preferably located to extend across the frame at right angles to the bottom-supporting timbers, F. The timbers $F^2$ are each provided with a series of two or more rollers, H, which support a table, T, and upon which said table is adapted to move back and forth, for a purpose hereinafter explained.

Upon the table T, preferably near its outer end, is revolubly mounted upon a suitable trunnion, J, another table, $T'$, which is adapted to support and carry a mold, M. This table is preferably guided by suitable blocks, $k$, secured to the table T, as shown in Figs. 1 and 3. The mold M is advisably furnished near its top, at diametrically-opposite sides, with two arms, $g$, upon which tie-rods $C'$ are placed, the lower ends of said tie-rods being secured to the revoluble table $T'$ to secure the mold M firmly thereto.

The table $T'$ is provided with depending brackets $y$ $y$, having perforated bosses $y'$ $y'$, for the support of a horizontal shaft, $S^3$, which is passed through said bosses and adapted to rotate therein. The shaft $S^3$ is provided at one end with a pinion, $G^5$, which meshes with a pinion, $H^3$, keyed to the lower extremity of trunnion J. This shaft $S^3$ will preferably be furnished with a groove throughout a portion of its length, and a collar, $y^2$, having a pin to enter said groove, is encircled about the shaft and adapted to have a sliding movement thereon, for a purpose that will presently appear.

The shaft $S^3$ is extended slightly beyond the edge of the frame F and provided near its free end with a ratchet-wheel, R, keyed to revolve therewith, but adapted to have a sliding movement thereon.

Upon the shaft $S^3$, adjacent to the ratchet-wheel R, is a loosely-mounted collar, $R'$, having an arm, L, projecting therefrom at right angles some distance beyond the periphery of the wheel R. This arm L is made with a dovetail groove, $h$, for the reception of a similarly-shaped pin, $W^2$, which has a sliding movement in said groove and may be secured at any desired adjustment therein. The pin $W^2$, which is carried by and extends at right angles to the arm L, is adapted to receive a rod, O, that is loosely connected to said pin, as shown in Fig. 1.

Pivoted to arm L, preferably at or near its free extremity, is a dog or pawl, P, that makes contact with the teeth of the ratchet-wheel R, its free end being held elevated and in contact with the teeth of said wheel by means of a short spring, $i$, Fig. 4, which rests at one end upon the arm L and at the other end against the under side of the pawl P.

The rod O extends from its pivotal connection with the arm L upwardly and is connected at its upper end to a wrist-pin, $W'$, of a crank-arm or wheel, C. This wheel C is keyed to the end of shaft $S'$, and is provided with a grooved or slotted bar, $j$, into which the wrist-pin is secured at any desired point throughout the length of said bar.

It will readily be seen that by adjusting the position of the rod O upon the bar $j$ and crank-arm L the throw of the latter may be changed at will, and thus the amount of rotation of the wheel R at each revolution of the wheel C may be regulated.

When it is desired to manufacture round pipe, the mold will be placed upon the table $T'$ and firmly clamped thereto, said mold of course being provided with a core, $M'$, at its center. The collar $y^2$ will then be secured upon the shaft $S^3$, immediately in rear of the carriage or table T, to permit the same from moving during the operation of packing the mold. A small quantity of cement or other material of which it is intended to make the pipe is placed in the mold M around its core $M'$ and the cross-head A lowered, so that the plunger, which is made with a broadened lower end, will reach the bottom of the mold. The cross-head A may be moved up and down by hand when desired by means of a rod, $H''$, secured to cross-head A, as shown in Figs. 2 and 3. Motion is now imparted to the shaft $S'$, and a reciprocating movement is thus transmitted, through mechanism which has been previously described, to the plunger D, causing the latter to firmly pack the material in the mold. As the mold becomes filled, the cross-head A gradually rises through the medium of the weight W, and it may be here stated that the force of the blow given at each stroke of the plunger is regulated by the excess of weight of the cross-head A and plunger D over the weight of the balance W. When motion is imparted to the plunger D, the wheel C is rotated and an intermittent rotation is given to the shaft $S^3$ through the medium of the rod O, arm L, wheel C, and ratchet mechanism. The shaft $S^3$ being thus actuated, the table T' will be turned a short distance by the meshing of the pinions $G^5$ and $H^3$ at each revolution of wheel C. It will thus be seen that simultaneous with the operation of the packing-plunger the mold is caused to be revolved to present a new surface to said plunger, and all parts of the machine are operated from a common source of power.

It is sometimes desirable to manufacture pipe of oval, elliptical, or other form, and to accomplish this I have provided the machine with features of construction which I will now explain.

A templet, E', of the desired shape is secured to the top of the table T', as shown in Fig. 8. This templet is adapted to engage an anti-friction roller, U, mounted in a bracket, U', secured to the frame-work F. A rope, V, is attached to the table T, preferably at the point $z$, and, passing over pulleys V' $V^2$, journaled in brackets $V^3$ $V^4$, secured to the frame-work, is provided at its free end with a weight, $V^5$. The pulling action of this weight $V^5$ upon the table T will cause the templet E' to bear against the roller U, and as the table T' is revolved, as above explained, the table T will be caused to travel back and forth upon the rollers H, in conformity with the shape of the templet E'. It is obvious that templets of any desired shape may be secured to the table T in the manufacture of pipes of any desired shape.

It is apparent that slight changes might be made in the constructive details of my invention without departing from the spirit and scope thereof; hence I do not wish to limit myself to the exact details of construction herein described; but, Having fully described my invention, what I claim as new, and desire to secure by Letters Patent, is—

1. In a pipe-machine, the combination, with suitable frame-work and a mold, of a sliding cross-head, a plunger, eccentric mechanism located inside the cross-head, and gearing for actuating said mechanism to impart a reciprocating motion to the plunger, substantially as set forth.

2. In a pipe-machine, the combination, with suitable frame-work and a mold, of a sliding cross head counterbalanced by suitable means, a plunger, eccentric mechanism located inside the cross-head, and gearing for actuating said mechanism to impart a reciprocating motion to the plunger, substantially as set forth.

3. In a pipe-machine, the combination, with suitable frame-work, of a sliding cross-head, a mold, a plunger, eccentric mechanism located inside the cross-head, gearing for operating said mechanism to impart a reciprocating motion to the plunger, and mechanism, substantially as described, for revolving the mold, substantially as set forth.

4. In a pipe-machine, the combination, with suitable frame-work and a mold, of a suspended cross-head, a plunger, eccentric mechanism located inside the cross-head, gearing for actuating said mechanism, a rotary reciprocatory table for supporting the mold, gearing for imparting an intermittent rotary motion to said table, and devices to regulate the speed of such rotation, substantially as set forth.

5. In a pipe-machine, the combination, with suitable frame-work and a mold, of a cross-head, a shaft mounted in the cross-head and carrying an eccentric collar, a yoke within the cross-head, a plunger secured to the yoke, and mechanism for rotating the eccentric collar to impart a reciprocating movement to the plunger, substantially as set forth.

6. In a pipe-machine, the combination, with suitable frame-work, of a table, mechanism for rotating said table, a cross-head, a plunger suspended over the mold, and eccentric mechanism located inside the cross-head for reciprocating the plunger, substantially as set forth.

7. In a pipe-machine, the combination, with a pivoted mold-carrying table, of a cross-head having an interior chamber suspended and counterbalanced to move in vertical guides, a shaft journaled in the cross-head and provided with an eccentric collar, a square block loosely mounted on said collar, a rectangular yoke surrounding this block, a plunger attached to the yoke, and gearing for rotating the shaft to impart a reciprocating movement to the yoke within the cross-head, substantially as set forth.

8. In a pipe-machine, the combination, with suitable frame-work, of a revoluble table having a pinion upon the end of its trunnion, gearing for imparting motion to said pinion, a cross-head mounted in the frame and carrying a plunger, and eccentric mechanism located inside the cross-head for imparting a reciprocating motion to said plunger, substantially as set forth.

9. In a pipe-machine, the combination, with suitable frame-work, a reciprocating plunger, a cross-head, and eccentric mechanism located inside the cross-head for giving motion to the plunger, of a table carrying a shaft, a pinion at one end of the shaft, and a ratchet-wheel near its opposite end, a pivoted table carrying a pinion to mesh with the pinion on the shaft, and gearing for imparting an intermittent rotation to said pivoted table, substantially as set forth.

10. In a pipe-machine, the combination, with suitable frame-work, a reciprocating plunger, a cross-head, and eccentric mechanism located inside the cross-head for giving motion to the plunger, of a table carrying a horizontal shaft, a pinion at one end of said shaft, and a ratchet-wheel near its opposite end, an arm loosely mounted on the shaft and carrying a pawl to engage the ratchet-wheel, and gearing for imparting a reciprocating motion to said arm, as and for the purpose set forth.

11. In a pipe-machine, the combination, with suitable frame-work, a pivoted table, and gearing for rotating the same, of a suspended cross-head, a plunger, eccentric mechanism located inside the cross-head, a pinion secured to a shaft of said mechanism, a vertical shaft mounted in the frame-work parallel with the cross-head, a pinion mounted upon a bracket attached to the cross-head and adapted to encircle the vertical shaft to rotate therewith, and gearing for rotating said vertical shaft, substantially as set forth.

12. In a pipe-machine, the combination, with suitable frame-work and a mold support, of a suspended cross-head, a plunger, eccentric mechanism located inside the cross-head, a pinion fixed to a shaft of said mechanism, a vertical shaft journaled in the frame-work, a pinion journaled in a bracket secured to the cross-head, said pinion being adapted to encircle the vertical shaft and rotate therewith to drive the first-mentioned pinion, a pinion at the upper end of the vertical shaft, and gearing for driving said shaft to impart a reciprocating motion to the plunger at any elevation of the cross-head, substantially as set forth.

13. In a pipe-machine, the combination, with a suitable frame-work, a suspended cross-head carrying a reciprocating plunger, and eccentric mechanism located inside the cross-head for operating said plunger, of a pivoted table beneath said plunger and mechanism for imparting a reciprocating motion to the plunger and an intermittent rotary movement to the table simultaneously, substantially as set forth.

14. In a pipe-machine, the combination, with suitable frame-work, a reciprocating plunger mounted therein, a cross-head, and eccentric mechanism located inside the cross-head for operating said plunger, of a pivoted table carrying a pinion, a shaft mounted beneath said table and carrying a pinion to mesh with the pinion of the shaft, a ratchet-wheel keyed to said shaft, an arm loosely mounted on the shaft, a pawl pivoted to this arm to engage the ratchet-wheel, a driving-shaft carrying a crank-wheel, and a rod connecting said crank-wheel with said arm, substantially as set forth.

15. In a pipe-machine, the combination, with suitable frame-work and a reciprocating plunger, of a laterally-movable table, a revolving table mounted thereon and carrying a templet of any desired shape, a roller to engage said templet, and mechanism for actuating the laterally-movable table, substantially as set forth.

16. In a pipe-machine, the combination, with suitable frame-work and a reciprocating plunger, of a laterally-movable table, a revoluble table mounted thereon, a templet secured to said revoluble table, a roller to engage the templet, devices for actuating the laterally-movable table, and mechanism whereby the revoluble table and plunger are operated simultaneously, substantially as set forth.

17. In a pipe-machine, the combination, with suitable frame-work, a reciprocating plunger, and gearing for actuating the same, of cross-timbers at the base of said frame, rollers mounted thereon, a laterally-movable table mounted on the rollers, a revoluble table mounted on the movable table and carrying a templet, a roller to engage the templet, gearing for rotating the revoluble table, and devices for moving the laterally-movable table, substantially as and for the purpose set forth.

18. In a pipe-machine, the combination, with suitable frame-work and a cross-head carrying a reciprocating plunger, of a laterally-movable table, a revoluble table mounted thereon and carrying a templet, a roller to engage said templet, gearing for rotating the revoluble table, a bracket secured to the frame-work and carrying a pulley, a rope secured at one end to the laterally-movable table and passed over said pulley, and a weight secured to the free end of said rope, substantially as set forth.

In testimony whereof I have signed this specification in the presence of two subscribing witnesses.

VALENTINE HEPP.

Witnesses:
W. A. MIDDLETON,
J. D. COLEMAN.